United States Patent
Werner et al.

(10) Patent No.: US 10,706,046 B2
(45) Date of Patent: Jul. 7, 2020

(54) METADATA-BASED GENERAL REQUEST TRANSLATOR FOR DISTRIBUTED COMPUTER SYSTEMS

(71) Applicant: Risk Management Solutions, Inc., Newark, CA (US)

(72) Inventors: Horst Werner, San Mateo, CA (US); Christof Bornhoevd, Belmont, CA (US)

(73) Assignee: RISK MANAGEMENT SOLUTIONS, INC., Newark, CA (US)

( * ) Notice: Subject to any disclaimer, the term of this patent is extended or adjusted under 35 U.S.C. 154(b) by 146 days.

(21) Appl. No.: 16/048,055

(22) Filed: Jul. 27, 2018

(65) Prior Publication Data

US 2019/0034482 A1   Jan. 31, 2019

Related U.S. Application Data

(60) Provisional application No. 62/538,576, filed on Jul. 28, 2017.

(51) Int. Cl.
| | |
|---|---|
| G06F 7/00 | (2006.01) |
| G06F 16/2452 | (2019.01) |
| G06F 16/23 | (2019.01) |
| G06F 16/242 | (2019.01) |
| G06F 16/2453 | (2019.01) |
| G06F 16/2457 | (2019.01) |
| G06F 16/21 | (2019.01) |

(52) U.S. Cl.
CPC ........ *G06F 16/2452* (2019.01); *G06F 16/211* (2019.01); *G06F 16/2393* (2019.01); *G06F 16/2433* (2019.01); *G06F 16/24534* (2019.01); *G06F 16/24573* (2019.01)

(58) Field of Classification Search
CPC ........... G06F 16/2452; G06F 16/24573; G06F 16/2433; G06F 16/24534; G06F 16/211; G06F 16/2393
USPC .................................................. 707/600–899
See application file for complete search history.

(56) References Cited

U.S. PATENT DOCUMENTS 10,545,955 B2 * 1/2020 Djordjevic ............ G06F 16/248

* cited by examiner

*Primary Examiner* — Isaac M Woo
(74) *Attorney, Agent, or Firm* — Hickman Palermo Becker Bingham LLP

(57) ABSTRACT

In an embodiment, a method comprises generating and storing metadata that maps a domain model to data stored in a data store, wherein the domain model describes the data and relationships between the data; receiving, from a client application, a request for data stored in the data store, wherein the request is in a first query language; translating the request into one or more queries based on the metadata, wherein the one or more queries are in a second query language; sending the one or more queries to the data store; receiving a first result set from the data store, based on the data store executing the one or more queries.

20 Claims, 10 Drawing Sheets

REQUEST 400

```
SELECT customer.name,
       COUNT (or->order.id) AS ordercount
       SUM (SUM(it->item.price)) as revenue,
       SUM (COUNT(it->article.id)) AS numofarticles
FROM customer->#(order->#(item->article) AS it) AS or
WHERE ar->article.category = 'sports'
```

FIG. 4

QUERY 900

```
SELECT t1.NAME,
       f2,
       f3,
       f4
FROM   tb_customer AS t1
       JOIN (SELECT t2.customerid AS f8,
                    Count(t2.id) AS f2
                    Sum(f5) AS f3,
                    Sum(f6) AS f4
             FROM   tb_order AS t2
                    JOIN (SELECT Sum(t3.price) AS f5,
                                 Count(t4.id) AS f6,
                                 t3.orderid AS f7
                          FROM   tb_orderitem AS t3
                                 JOIN tb_article AS t4
                                 ON t4.id = t3.articleid
                          WHERE  t4.category = 'sports'
                          GROUP  BY t3.orderid) AS t5
                    on t2.id = f7
             GROUP BY f8) AS f6
       on t1.id = f8
```

FIG. 9

METADATA-BASED GENERAL REQUEST TRANSLATOR FOR DISTRIBUTED COMPUTER SYSTEMS

BENEFIT CLAIM

This application claims the benefit under 35 U.S.C. § 119(e) of provisional application 62/538,576, filed Jul. 28, 2017, the entire contents of which is hereby incorporated by reference as if fully set forth herein.

FIELD OF THE DISCLOSURE

The present disclosure relates generally to query processing in networked, distributed computer systems. More specifically, the disclosure relates to computer-implemented techniques for data retrieval using a metadata-based general request translator and an adaptive storage optimizer.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Cloud-based computer program applications may be built on backend services that expose an application interface (API) which serves data to a frontend, such as a user interface or other services. The backend services may connect to a data store, such as a relational database, that can be queried using a query language such as structured query language (SQL). The backend services interpret client requests, sends corresponding requests to a data store, and transforms the received data into a transport format according to the service's convention (e.g., XML or JSON).

Different end points may be implemented for specific information needs. However, writing and maintaining the code for each of these end points is a major cost driver in the development of a cloud-based application. In addition, as the information needs of the consumers change over time, changes in the conventions of the corresponding end points are required. If backward compatibility is desired, multiple versions of each end point's code must be maintained, which multiplies the maintenance cost.

Some existing frameworks, e.g. Spring, Struts, Hibernate, Ruby on Rails, simplify the generation of suitable requests to the datastore. For certain constrained use cases, such as Create, Read, Update or Delete (CRUD) services, the automatic generation of end point code is possible. However, generic storage and generated CRUD services provide poor performance compared to manually configured storage and coded end points. Typically, a person designing the backend services uses knowledge about the anticipated usage patterns and data volume to optimize the backend, while the generated CRUD services are unable to be optimized based on anticipated usage patterns and data volume. Furthermore, CRUD services are unable to efficiently handle complex queries spanning multiple entities.

One possible solution is to expose fewer end points, each with more powerful query capabilities. To maximize flexibility, the data store's query language could be directly exposed to the frontend services. However, this approach is not viable because 1) security considerations prohibit sending queries directly from the client to the data store; 2) queries may get too long and complicated; and 3) any changes in the data store would cause the consuming applications to cease to function.

Another possible approach is to use single end points with a high-level universal query language that is decoupled from the internal data store representation. They may expose metadata describing the types of objects, attributes and relations between objects, which allows the API convention to be stable even when information in the data store needs to change. Only the metadata returned by the API changes, and the consumers can often dynamically adapt to this. This approach may be implemented on generic data stores using, for example, Metaweb's Freebase and MQL language and SAP's HANA Graph which exposes the GEM language. Since these stores have no predefined schema for specific object types, the translation between high-level queries and the data store can be generic. However, generic data stores have disadvantages such as higher cost and/or lower performance compared to conventional databases.

Another high-level query language is Graph QL. However, Graph QL needs to be mapped to a pre-defined schema by means of code. Thus, while it shares the advantage of having a stable API, it still requires writing or re-writing code to establish or change a backend service. Also, Graph QL cannot express aggregations such as sums, averages, and counts, which means that any aggregations that may be required must be pre-defined and implemented in backend code.

Thus, a solution that does not require choosing between well-performing backends at the cost of developing, testing and deploying code and having limited flexibility with respect to the possible queries, or flexible, data-driven generic backends that can't handle complex analytical queries while maintaining good performance is desired.

SUMMARY

The appended claims may serve as a summary of the invention.

Broadly stated, the present method recites a method according to claim 1.

The present system also recites a computing system according to claim 11, a computing device according to claim 12 and a computer program claim according to claim 13.

BRIEF DESCRIPTION OF THE DRAWINGS

In the drawings:

FIG. 4 illustrates an example request for data in a general request language.

FIG. 9 is a block diagram illustrating an example translated query.

DETAILED DESCRIPTION

Figure 1:
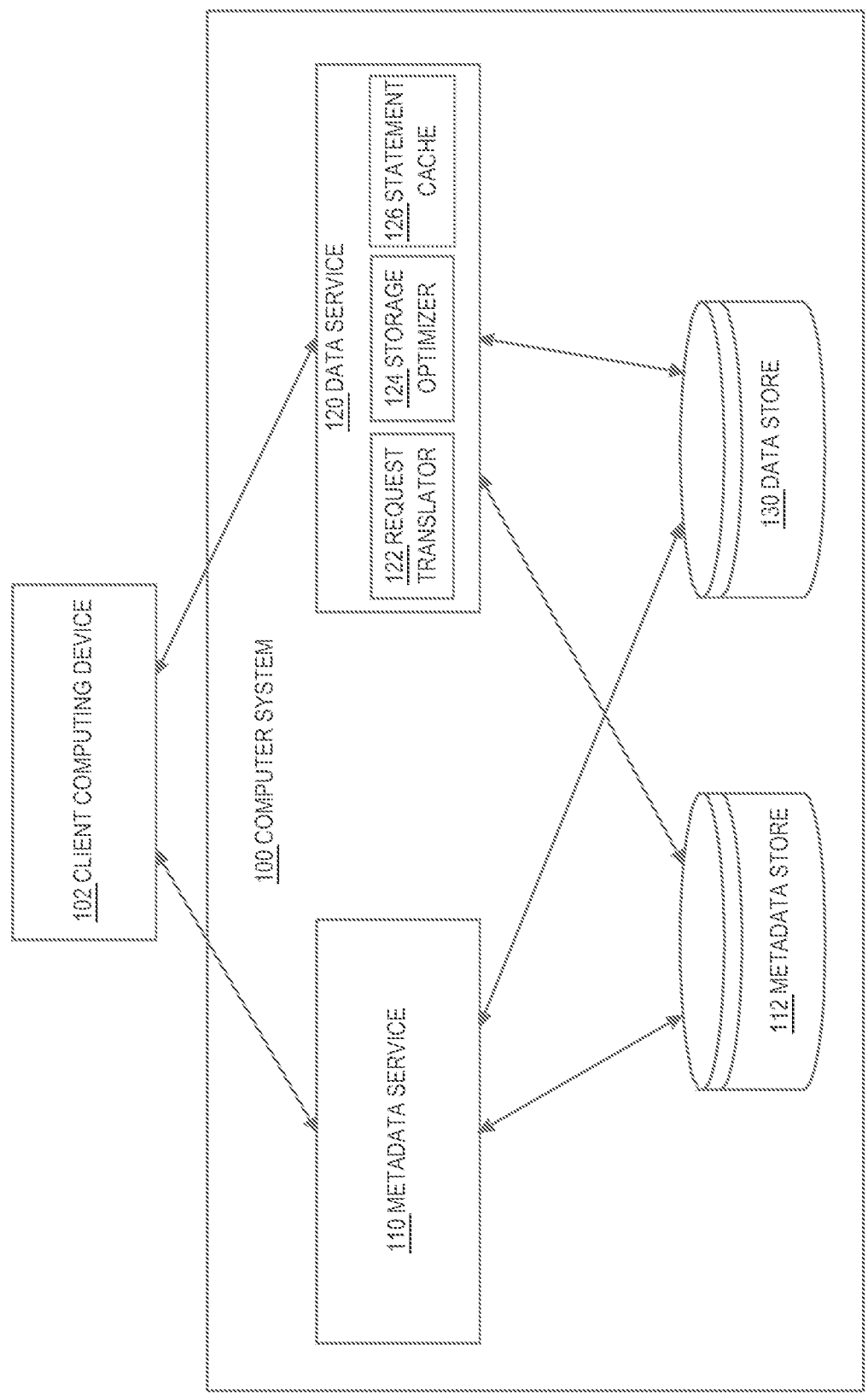
FIG. 1 is a block diagram illustrating an example system in which the techniques described herein may be practiced, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 General Overview

Techniques are described herein for data retrieval using a metadata-based general request translator.

A general request language is tailored to the needs of analytical applications (supporting specifically multi-level aggregation on tables). In an embodiment, the request language combines traits of SQL, such as field selection, filtering, and aggregation, with traits of graph-based query languages, such as traversal of relations. Frontend client applications send requests using the general request language. The request language may allow requests with theoretically unlimited levels of nesting, which makes it sufficiently expressive to cover all the information needs of most client applications. A metadata-driven general request translator translates requests from the general request language into storage-specific queries.

The metadata comprises a domain model, which describes names and data types of objects, attributes, and associations of data stored in the data storage, in a storage-agnostic manner. Additionally, the metadata may comprise a mapping of these objects, attributes and associations to portions of the data stored in the data storage. For example, the mapping may map objects, attributes, and associations of the domain model to tables, fields and JOIN expressions of a relational database.

In an embodiment, a metadata service exposes the ability for users to read and write the domain model. By writing to the domain model, entity, attribute and association types are created, changed or deleted. When new entity or property types are created, corresponding tables and columns may be automatically generated to store entities and properties of these types.

In an embodiment, a data service endpoint receives a request specified in the general request language and passes it to the request translator. The request translator translates the request into a corresponding query language statement, such as a SQL statement, to answer the request. After executing that query statement, the results are transformed into the appropriate response format by a generic transformer.

In an embodiment, the request language allows the definition of soft-coded views for frequently used queries. The request translator may simply substitute the view definitions for the view shorthand names. Additionally or alternatively, the frequency and total time consumed for requests using each of these views may be recorded. When a certain threshold of frequency and/or total time consumed for requests is passed during a specified time interval, a storage optimizer may modify the data store to better serve recorded usage patterns.

In an embodiment, the storage optimizer may create indexes and materialized database views for the whole or parts of the soft-coded view. Thus, the system provides a self-optimizing backend that generates data structures that are best for a client or customer's usage pattern, without involving a system administrator or other user.

In addition, since it is also reliably isolated against the database itself by the translation process, complex queries that are implemented in the backend code in conventional applications can now be defined exclusively in the frontend code.

A benefit of the techniques describe herein is that they solve the tradeoff situation described above by providing a generic backend for analytical applications that optimizes itself dynamically by observing the usage patterns. The generic backend is provided as a service that can be set up and maintained for an individual application without development and deployment of any code, but at the same time provides performance comparable to manually created backends using self-optimization. The development lifecycle for new applications leaves out the expensive part of backend code development, test and deployment, as it only consists of configuring the domain model and writing frontend code.

An additional advantage is that the extensibility and the metadata service can be used to create data-driven user interfaces that are robust against backend changes, thus eliminating a frequent source of defects—i.e., the mismatch between backend and frontend code. Furthermore, keeping multiple versions of the backend behavior means simply keeping multiple versions of the metadata, which comes at minimal cost compared to keeping multiple versions of backend code.

2.0 System Overview

FIG. 1 illustrates an example system in which the techniques described herein may be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

Embodiments of the system 100 may include, but are not limited to, a standalone computer system that includes data storage and display components, a multiple computer server system with multiple components configured and implemented and multiple computer systems, or a multiple computer server system with multiple components configured and implemented on server systems located within a cloud server.

Computer system 100 receives arbitrary data retrieval and analytical requests on data at the lowest available granularity and provides an abstraction from the underlying data store engine and the technical artifacts used for data representation.

In FIG. 1, computer system 100 comprises a metadata service 110, a metadata store 112, a data service 120, and one or more data stores 130.

2.1 Client Computer

In an embodiment, computer system 100 is configured to receive requests from a client computer 102. The client computer 102 may be communicatively connected to computer system 100 through any kind of computer network using any combination of wired and wireless communication, including, but not limited to: a Local Area Network (LAN), a Wide Area Network (WAN), one or more internetworks such as the public Internet, or a company network.

In an embodiment, client computer 102 is any computing device, such as a server, rack, work station, personal computer, general purpose computer, laptop, Internet appliance, wireless device, wired device, multi-processor system, minicomputer, hand-held computer, wearable computer, cellular or mobile phone, portable digital assistant (PDAs, or tablet computer), and the like. Although a single client computer 102 is depicted in FIG. 1, computer system 100 may receive requests from any number of client computers.

Client computer 102 includes other hardware elements, such as one or more input devices, memory, processors, and the like, which are not depicted in FIG. 1. Client computer 102 also includes applications, software, and other executable instructions to facilitate various aspects of embodiments described herein. These applications, software, and other executable instructions may be installed by a user, owner, manufacturer, or other entity related to the client computer or the computer system.

Client computer 102 may execute a command line interface, a graphic user interface, a REST endpoint, or other front-end application or service to interact with the system 100. The graphic user interface may be displayed in a browser executing on client computer 102.

In an embodiment, the interface, endpoint, application and/or service may be configured or programmed to provide a search query to the computer system 100 and receive a set of search results generated by computer system 100. In an embodiment, the set of search results may be stored in a data file provided to the client computer or in a data file accessible by the client computer. Example data files include JSON, comma separated values, SQL dump, and other file types. Additionally or alternatively, the set of search results may be displayed at client computer using, for example, the command line interface or the graphical user interface.

In an embodiment, the interface, endpoint, application and/or service may be configured or programmed to request domain model information from computer system 100 and receive metadata describing the domain model. The metadata may be used to formulate the search queries provided to the system 100.

Additionally or alternatively, the interface, endpoint, application and/or service may be configured or programmed to provide domain model configuration requests to computer system 100. The domain model configuration requests may be, for example, requests to add, remove, or modify domain model entities and/or properties.

2.2 Metadata Service

In an embodiment, a domain model describes the data stored in data store and relationships and/or associations between the data. The models are in a form that is agnostic of the actual storage technology (e.g. RDBMS). The domain model may comprise a plurality of entities. The logical model may include sub-typing an inheritance. A particular entity may comprise a set of one or more sub-types of the particular entity. For example, an "article" may have sub-types "sports," "home goods," "clothing," and "electronics," which inherit all fields from the "article" entity and have additional fields according to their specific nature. The entities are connected by named associations, which usually have the same name as the associated entity. Thus, the data and the domain model effectively form a large and complex graph.

In one embodiment, metadata store 112 is a data storage subsystem consisting of programs and data that is stored on any suitable storage device such as one or more hard disk drives, memories, or any other electronic digital data recording device configured to store data. Although metadata store 112 is depicted as a single device in FIG. 1, metadata store 112 may span multiple devices located in one or more physical locations. For example, metadata store 112 may include one or nodes located at one or more data warehouses. Additionally, in one embodiment, metadata store 112 may be located on the same device or devices as metadata service 110, data service 120, and/or data store 130. Alternatively, metadata store 112 may be located on a separate device or devices from metadata service 110, data service 120, and data store 130.

In an embodiment, the metadata store 112 stores one or more mappings that map entities in the domain model to data stored in the data store 130. Additionally or alternatively, the metadata store 112 stores metadata information describing the domain model.

In an embodiment, metadata service 110 comprises program instructions that are programmed or configured to perform a variety of functions needed for managing the domain model and associated metadata, including but not limited to: receiving requests for metadata and/or mappings, receiving requests to generate metadata and/or mappings, retrieving metadata and/or mappings from metadata storage 112, sending metadata and/or mappings to the client computer 102, generating metadata and/or mappings, storing metadata and/or mappings to metadata storage 112, modifying metadata and/or mappings stored in metadata storage 112, and any other aspects of embodiments described herein.

Additionally or alternatively, metadata service 110 provides an API that may be accessed, for example, by a web browser or client application running on client computer, to perform the functions related to managing the domain model and associated metadata.

In an embodiment, the metadata service 110 provides data describing which types of entities are stored in a backend data storage, such as in data store 130, and which property and association types the entities have. The metadata service 110 may provide the data in response to a request from a client computer.

Additionally or alternatively, the metadata service provides data describing a mapping between the entities stored in the backend data storage and the domain model. The mapping may be used by a backend data service, such as data service 120, to translate queries based on the domain model into queries for the data store 130.

In an embodiment, the metadata service 110 receives requests to define new entities and/or properties in the domain model. In response to receiving a request specifying new entity and/or property definitions, the metadata service 110 updates the metadata describing the domain model with the new entity and/or property definitions.

In an embodiment, in response to receiving a request specifying new entity and/or property definitions, the metadata service 110 generates the corresponding required storage structures in the data store 130. Additionally or alternatively, the metadata service 110 may generate or update a mapping to map the new entities and/or properties in the domain model to the generated storage structures. When a request makes amendments to the metadata (i.e., adding a new field to an existing table or adding a new entity), generation of the corresponding tables and mapping information is triggered. For example, assume the data storage comprises a database. The metadata service 110 may receive a request specifying new fields or entities for the domain model and cause corresponding tables and columns to be created in a database in data store 130.

As another example when a new attribute is created, the metadata service 110 looks up the database type corresponding to the data type defined in the domain model (e.g. for a string in the domain model, a database field of type VARCHAR will be created). For an entity, a new table may be created with a column for each attribute and an association with a cardinality of one. In the latter case, the column may contain the foreign key of the associated entity.

This allows a backend to be created for an entirely new application without the overhead of writing, testing and deploying code.

2.3 Data Service

In an embodiment, the data store 130 is a data storage subsystem consisting of programs and data that is stored on any suitable storage device such as one or more hard disk drives, memories, or any other electronic digital data recording device configured to store data. Although data store 130 is depicted as a single device in FIG. 1, data store 130 may span multiple devices located in one or more physical locations. For example, data store 130 may include one or nodes located at one or more data warehouses. In some embodiments, data store 130 may be located on the same device or devices as metadata store 112, metadata service 110, and/or data service 120. Alternatively, data store 130 may be located on a separate device or devices from metadata store 112, metadata service 110, and/or data service 120.

The data stored in the data store 130 may be in any data and/or storage format, such as a relational database, a columnar database, a noSQL database, one or more flat files, and the like. Additionally or alternatively, the data store 130 may comprise data stored in a plurality of respective formats. Additionally or alternatively, the data store 130 may be communicatively connected with other components, either directly or indirectly, such as one or more third party data suppliers. Data store 130 may be configured to receive or retrieve requested data from the one or more third party data suppliers.

In an embodiment, data service 120 comprises program instructions that are programmed or configured to perform a variety of functions needed for processing requests for data, including but not limited to: receiving requests from client computer 102, translating requests into a query language, sending translated queries to the data store 130, receiving data from data store 130, translating the received data into a requested format, sending query results to client computer 102, and any other aspects of embodiments described herein.

Additionally or alternatively, data service 120 provides an API that may be accessed, for example, by a web browser or client application running on client computer 102, to perform the functions related to processing data requests.

In an embodiment, data service 120 comprises a plurality of end points for receiving requests and providing data to frontend services and applications.

In an embodiment, a plurality of end points each use the same request language and translation process, but each end point may differ in the way the results are encoded and transported to the consumer. In an embodiment, a property type of the requested data defines the data format, and a different end point would be used depending on the data format. For example, a first end point would be called for a binary data format and a second end point may be called for a compressed data format.

In an embodiment, to extract large data sets, for example to retrieve entire portfolios for model execution, one or more separate end points may return the requested data in specific, optimized formats. For example, the system may return requested data as Parquet files for processing with Spark.

In the illustrated embodiment, data service 120 comprises request translator 122, storage optimizer 124, and statement cache 126.

In an embodiment, query execution goes through a translation process at data service 120. Incoming requests from client computer 102 are formulated in a first request language, such as a general request language or a declarative query language. The requests are formulated against the domain model, rather than the underlying data stored in data store 130. That is, the queries do not rely on knowledge of the data structure or format of the data it is requesting.

In response to receiving the request, the request translator 122 translates the requests into database management engine-specific requests based on the underlying storage structure and data format of data store 130. The translated request is sent to data store 130 and executed at data store 130. For example, request translator 122 may receive a request in a general request language and translate the request into a SQL query to be executed by data store 130 to retrieve data from a database.

The purpose of the general request language is to allow the execution of complex queries on data in a single client-to-server round-trip. In an embodiment, the overall syntax of the general request language is similar to declarative query languages such as SQL, but instead of JOIN statements, it uses a more compact notation to describe the composition of result sets extending over multiple entity types and their aggregations. The compact notation is referred to herein as the "navigation path."

As an example, a request in the general request language may have the form:

```
SELECT <field list>
FROM <navigation path>
WHERE <condition>
[GROUP-BY <grouping>]
[ORDER-BY <order field>]
[TOP <number of rows to return>]
```

The navigation path consists of a start entity type followed by a sequence of associations to indicate which other entity types are being joined. An example association may be:

customer→order→item

In the above example, customer entity is joined with order entity and item entity.

Additionally, a navigation path can also include aggregation over all records associated with one entity. As an example, the request:

customer→order→item) as or will produce one row per order, which contains selected fields of the customer, the order, and aggregated fields of all items associated with the order.

In an embodiment, storage optimizer 124 is programmed or configured to track usage patterns based on requests received by the data service 120. As described in further detail below, based on the usage patterns, the storage optimizer 124 determines whether to optimize the data stored in data storage. Optimizing the data may include, for example, generating and storing one or more materialized views, saving one or more pre-defined navigation paths, field selections, and other request statements, modifying the structure of the stored data, and etc. A benefit of the present system is that it provides a self-optimizing backend that generates data structures that are best for a client or customer's usage pattern, without involving a system administrator or other user.

In an embodiment, the data service 120 includes a statement cache 126. The statement cache 126 may be programmed or configured to store or cache a copy of previously retrieved results. The statement cache 126 may store data mapping the text of a request to a stored or cached copy previously retrieved results. When a request is received, the data service 120 may determine based on the mapping that the corresponding result is stored in the statement cache. In response to determining that the corresponding result has been cached, the request translation and query execution are by-passed, and the corresponding cache content is retrieved from the statement cache and returned as response to the request. In an embodiment, cached requests and responses are removed from the cache whenever the corresponding data in the data store is modified.

3.0 Domain Model Entity Creation

In an embodiment, a developer intending to develop a new application provides a technology-agnostic model (i.e., domain model) of the entities his application will manage to the computer system. The metadata service 110 may receive the domain model and generate metadata describing the domain model. Additionally, the metadata service 110 may cause data store 130 to generate data entities, attributes, and/or associations corresponding to the domain model.

In an embodiment, the domain model is provided in a format according to a metadata API. Additionally or alternatively, the creation of that domain model is facilitated by a user interface for viewing, creating, and/or modifying a domain model.

In an embodiment, the domain model comprises an ID and a name of an entity type. Additionally, the domain model may comprise a plurality of entity attributes and a plurality of entity associations. As an example, one entity could be an order in a retail scenario. An example domain model for the order entity may be:

```
{"entity": "order",
    "displayname": "Order",
    "attributes": [
        "id": {"datatype": "long", "displaytext": "ID"},
        "total": {"datatype": "currency", "displaytext": "Total"}
    ],
    "associations": [
        {"id": "customer", "target": "customer", "cardinality": "single"},
        {"id": "item", "target": "lineitem", "cardinality": "multiple"}
    ]}
```

Figure 2:
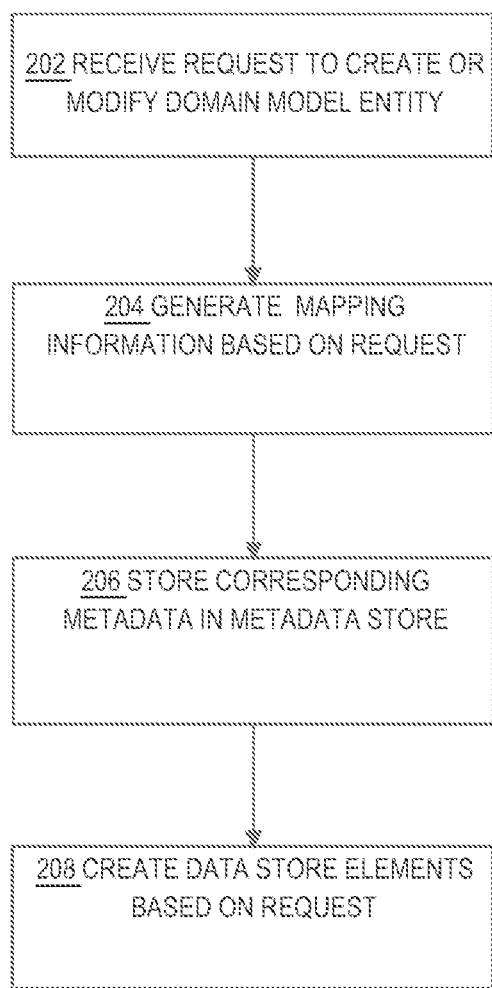
FIG. 2 is a block diagram illustrating an example metadata creation process, according to one embodiment.

FIG. 2 illustrates example steps for creating a domain model.

At step 202, metadata service 110 receives a request to create or modify a domain model entity from client computer 102. For the purpose of illustrating a clear example, assume the client computer 102 sends a request to create the above example domain model to the metadata service 110.

At step 204, the metadata service generates mapping information for translating from the domain model to a data store representation. Generating the mapping information may comprise determining, for each entity, attribute, and/or association, a corresponding data entity, attribute information, and/or associations.

In an embodiment, generating the mapping information comprises determining the data format in which data is stored in data store 130. For example, if data store 130 stores data in a relational database, the mapping information may map domain model entities to database tables, attributes to columns, and associations to foreign keys.

Referring to the above example, the domain model with added mapping information may be:

```
{"entity": "order",
    "displayname": "Order",
    "table": "client_a.tb_order",
    "attributes": [
        "id": {"datatype": "long" "displaytext": "ID", "column": "id"},
        "total": {"datatype": "currency", "displaytext": "Total",
"column": "total"}
    ],
    "associations": [
        {"id": "customer", "target": "customer", "cardinality": "single",
        "join": "JOIN $customer$ ON $customer$.id = $order$.customerid"},
        {"id": "item", "target": "lineitem", "cardinality": multiple,
"join":
        "JOIN $lineitem$ ON $lineitem$.orderid = $order$.id"}
    ]}
```

In step 206, the metadata and/or the mapping information are stored in a metadata store. In the present example, the domain model, amended with the mapping information, is stored in the metadata store 112.

In step 208, data store elements are created based on the domain model. In an embodiment, the metadata service 112 generates statements for creating the target representation in the data store 130. The statements are executed at the data store 130 to generate the corresponding data entities. An example statement for generating the data entities may be:

```
CREATE TABLE client_a.tb_order(
    id BIGINT,
    total DECIMAL(12,4),
    customerid BIGINT
);
```

After the above metadata creation process, the developer is able to develop, test, and put to productive use, a new application that uses the data service 120 as a backend. If the application includes a user interface, entities and attributes shown to the user can be dynamically derived by calls to the metadata service 110. This is particularly useful for table views in a user interface, where the columns to be shown can be dynamically determined without impacting the layout. When additional fields are added to an entity at a later point in time, the user interface may automatically adapt without any changes to the code by requesting updated metadata that describes the updated domain model.

4.0 Data Request Handling

To retrieve data from data storage 130, a frontend application or service sends a request to the data service 120. In contrast to conventional REST services, the request may be specified in the above-mentioned general request language.

As an example, assume a user wants to answer the following question: "For each customer, how many orders contain articles of the "sports" category, what is the total number and the revenue from these articles?"

The domain model, that is the public part of the metadata, contains the entities "customer," "order," "lineitem" and "article" and their respective fields (e.g. "id," "name," "price," "category"). It also contains the information that the customer has an association named "order" which points at a multiplicity of orders, that an order has an association "item" pointing at a multiplicity of line items and that a line item has an association "article" pointing at one article.

In an embodiment, the client computer may send a request to metadata service 110 for the metadata describing the domain model. In response to receiving the request, the metadata service 110 retrieves the requested metadata and sends it to the client computer. Additionally or alternatively, the request may be sent to the data service 120. The request may be in the general request language. Rather than translating the request and sending it to the data store, the data service may determine that it is a request for metadata and send the request to the metadata service. Using the received metadata, a user is able to formulate a request based on the domain model.

Figure 3:
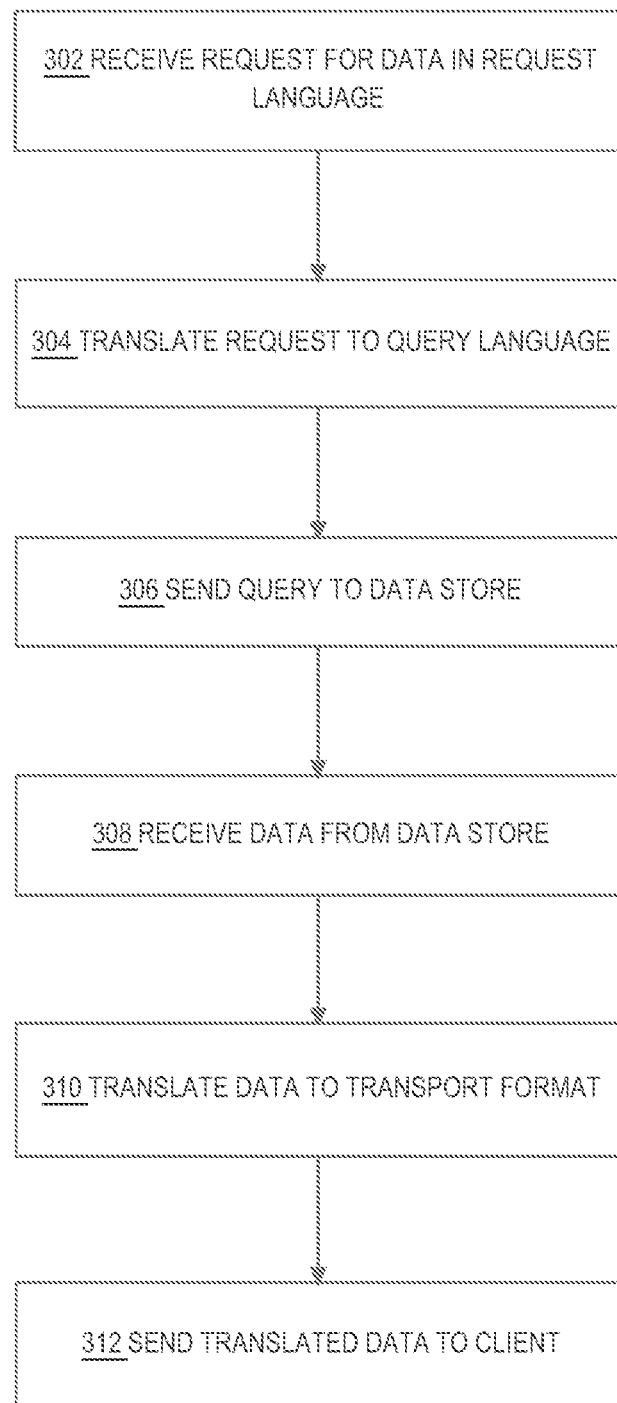
FIG. 3 is a block diagram illustrating an example request handling process, according to one embodiment.

FIG. 3 illustrates an example process for processing a request for data. At step 302, a request for data is received in a first query language, such as the general request language. For the purpose of illustrating a clear example, assume the request is for the question, "For each customer, how many orders contain articles of the "sports" category, what is the total number and the revenue from these articles?" FIG. 4 illustrates an example request 400 for this question, based on the domain model described above.

4.1 Request Translation

At step 304, in response to receiving the request, the data service 120 translates the request to a query language supported by the data storage 130. The translated request is used to retrieve the requested data from data storage 130.

In an embodiment, data storage 130 comprises data stored in a plurality of formats. For example, a first set of data in data storage 130 may support SQL queries while a second set of data in data storage 130 may support GraphQL queries. The query language into which the request is translated may be based on which set of data the request is targeted towards.

Figure 5:
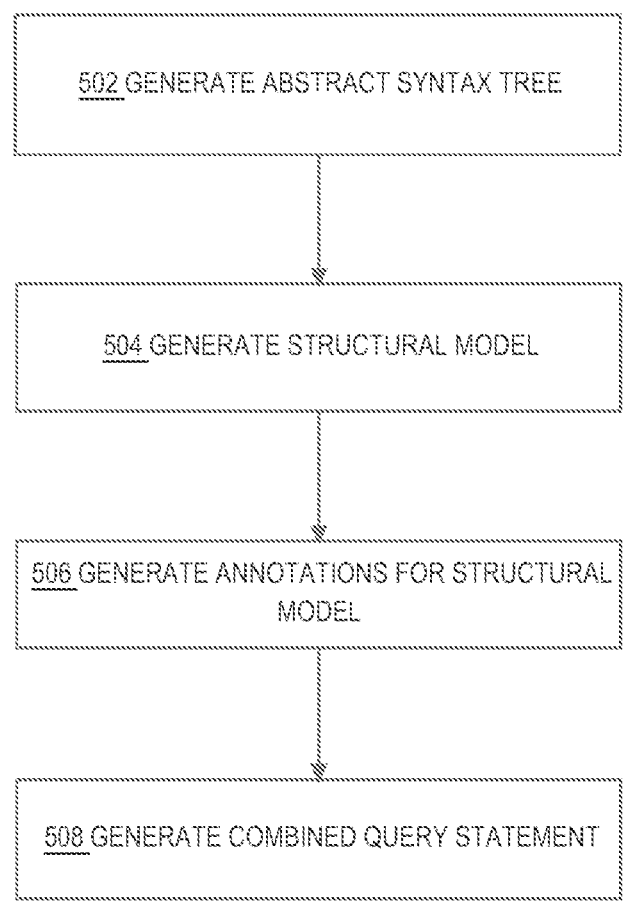
FIG. 5 is a block diagram illustrating an example request translation process, according to one embodiment.

FIG. 5 illustrates an example process for translating a request from the general request language to a data specific query language. In an embodiment, the request is transformed into a single corresponding query statement. In other embodiments, the request may be divided into a plurality of queries.

As an example, a request may target a portion of data stored in a first data store and/or format and a portion of data stored in a second data store and/or format. The request may be transformed into a first query statement corresponding to the first data store and/or format and a second query statement corresponding to the second data store and/or format.

At step 502, the request is parsed to generate an abstract syntax tree. In an embodiment, the request is syntactically validated and an abstract syntax tree (AST) of keywords and identifiers is created. In the AST, the identifiers for entities and fields are not yet connected to any particular meaning (i.e., data in the data store).

Figure 6:
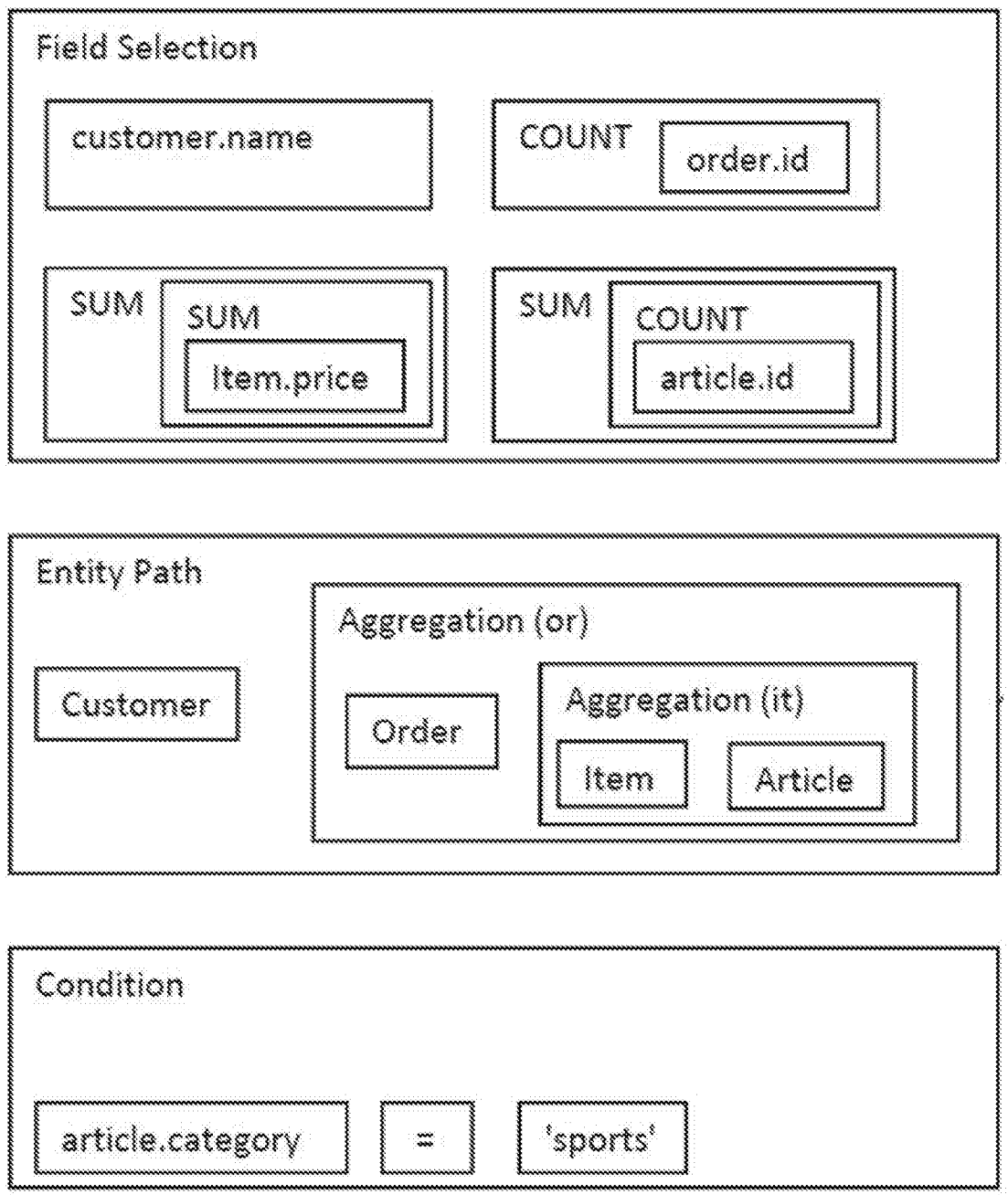
FIG. 6 is a block diagram illustrating an example abstract syntax tree.

FIG. 6 illustrates a block diagram depicting an example abstract syntax tree 600 corresponding to request 400. In the illustrated example, the request is divided into three components: field selection, entity path, and condition. Field selection includes portions of the request that identify particular domain model fields, such as "customer.name," "order.id," "article.id," etc.

Entity path includes portions of the request that identify a particular navigation path. In the illustrated example, "customer" has an association named "order" which points at a multiplicity of orders, that an order has an association "item" pointing at a multiplicity of line items, and that a line item has an association "article" pointing at an article. The AST also indicates that the "item" and "article" association are aggregated as "it," and the "it" and "order" association are aggregated as "or."

Condition specifies filters to be applied to the data. In the illustrated example, the condition is "article" whose "category" field is equal to "sports."

At step 504, the general structure of the request is derived from the "FROM" part and mapped to a structural model. This includes the semantic validation of the entities and associations.

Figure 7:
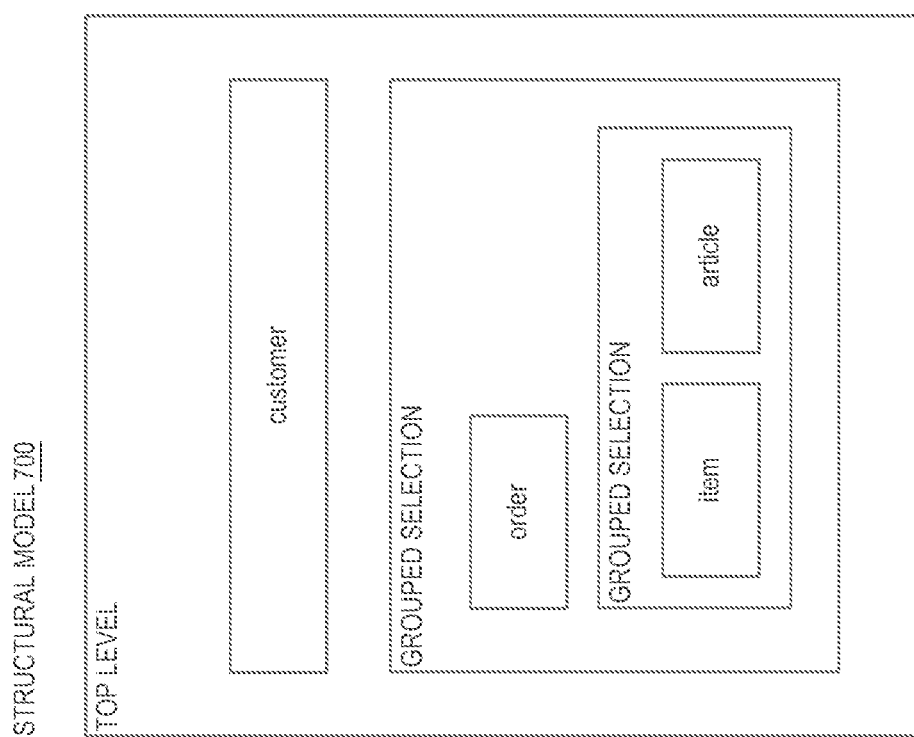
FIG. 7 is a block diagram illustrating an example structural model.

FIG. 7 illustrates an example structural model 700 based on request 400.

In an embodiment, several lookup structures are created. A global "scope" lookup maps the aliases given for the different aggregation levels of the navigation path (e.g., "or" and "it" for the order and line item level respectively) to the respective parts of the structural model. For each of these parts, a lookup structure for field annotations is maintained which maps identifiers for fields used in the request to field annotations.

At step 506, the entity models corresponding to the identifiers are looked up in the metadata and linked to the respective parts in the structural model. In an embodiment, looking up the corresponding entity models in the metadata comprises requesting or retrieving the mapping from metadata store 112.

In an embodiment, the field annotations are created when the "SELECT" part of the request is processed. A field annotation points to the corresponding meta data of the respective field (data type and mapping to database field or function) and contains the query language alias that has been generated in the scope of this specific request. The generation of unique query language aliases for selected fields (e.g., "f1", "f2", "f3") and tables ("t1", "t2") prevents potential name clashes in the generated queries. The lookup structures ensure that all occurrences of a field will eventually refer to the same alias.

Figure 8:
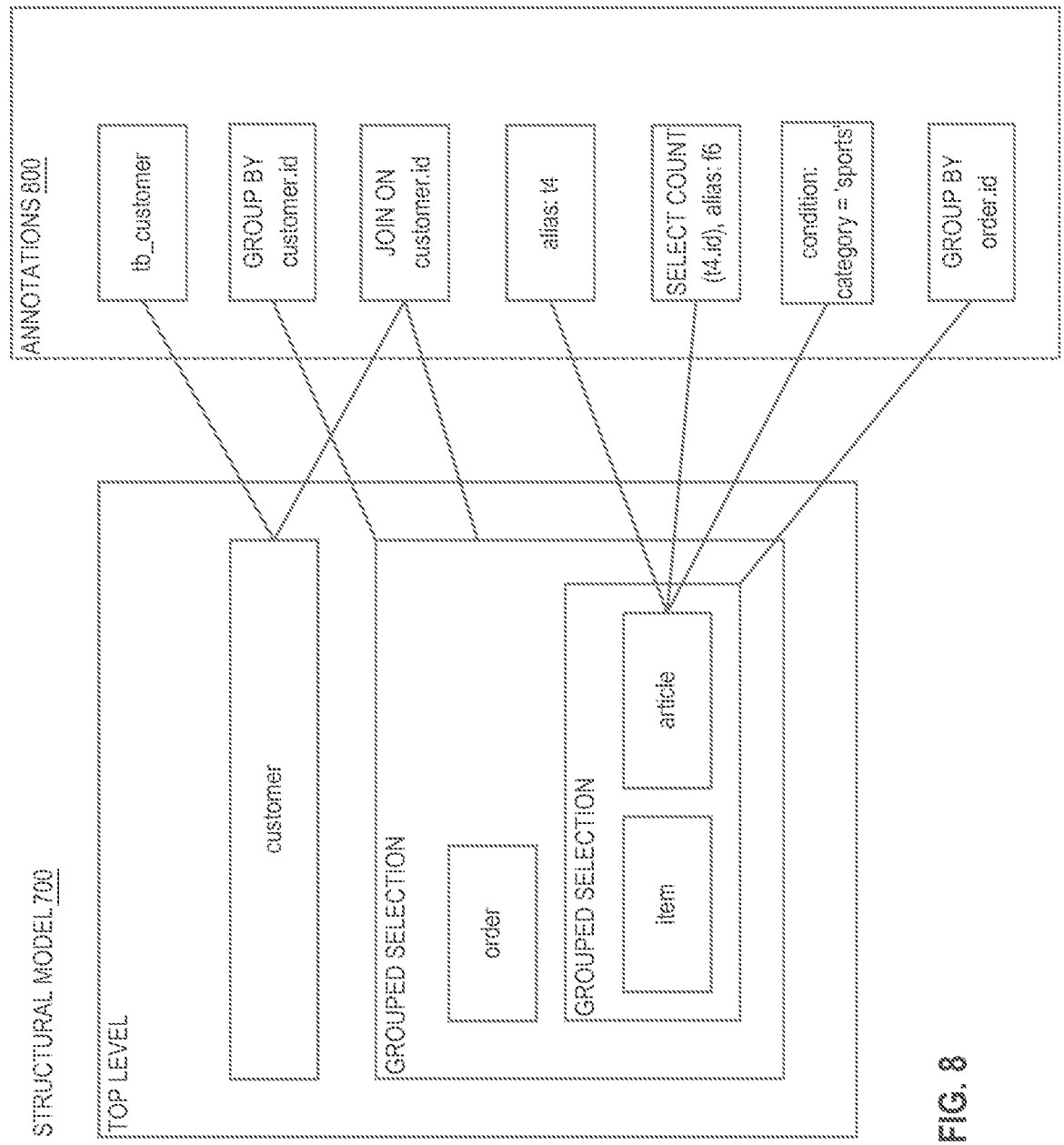
FIG. 8 is a block diagram illustrating example annotations of a structural model.

FIG. 8 illustrates example annotations 800 for structural model 700. The creation of field annotations for aggregations traversing multiple levels in the structural model is illustrated for the portion of the request, "SUM(COUNT (it→article.id))."

In an embodiment, the annotation process starts at the lowest level of the aggregation structure, i.e. with the innermost term in the expression "it→article." The request alias "it" identifies the part of the structural model where the unaggregated field is located. Associated to this part of the structural model there is the entity model of "article," with the property model for "id," including the corresponding database field. A field annotation for the "COUNT" of the database field is created, tagged with an SQL alias "f6" and linked to the respective part of the structure model. The process moves simultaneously upwards in the brace hierarchy of the expression "SUM(COUNT(it→article.id))" and the structural model. A new field annotation for SUM(f6) is created and linked to the top level of the structure model.

At step 508, after the creation of field annotations for all fields mentioned in the SELECT clause and WHERE conditions is completed, the assembly of the final query statement is performed. The statement is composed by merging the keywords for the respective constructs with the symbols from the field and table annotations.

FIG. 9 illustrates an example a query language request 900, into which request 400 was translated. In the illustrated embodiment, the request 400 has been translated into a SQL query.

4.1 Data Retrieval

Referring again to FIG. 3, after the request is translated, the method proceeds to step 306. In step 306, the translated statement is sent to the data store. The resulting query language statement is executed on the data store.

In step 308, data is received from the data store. The received data may be in any format in which the data was stored. In an embodiment, if the data is stored in multiple formats and/or locations, multiple data sets may be received. Each data set may be in a particular data format.

In step 310, the received data is transformed into a transport format. The transport format may be, for example, JSON, XML, or any other suitable format for providing query results to a frontend application. In an embodiment, if multiple data sets are received, each data set may be transformed into the same transport format.

In an embodiment, the data service 120 comprises a plurality of end points. Each end point may be configured to transform the data into a different format, and the particular format into which the results are transformed varies depending on the end point that is processing the request.

In step 312, the requested data is sent to the frontend application and/or service that sent the request. In an embodiment, the query results may be returned as simple result sets. Additionally or alternatively, for larger results, the system may support result paging. The data service 120 may sent the requested data as a plurality of result sets.

5.0 Optimizations

In an embodiment, the data service records the frequency and/or total time consumed for requests. When a certain threshold of frequency and/or total time consumed for requests is passed during a specified time interval, the storage optimizer may modify the data store to better serve recorded usage patterns. In an embodiment, the storage optimizer may create indexes and materialized database views for the whole or parts of soft-coded views.

Referring to the above example, the request or similar requests may be sent many times. The request may therefore comprise one or more view definition statements. A view definition statement defines a shorthand expression for a navigation path (i.e. the FROM portion) and any field selections.

An example view definition statement may be:

```
DEFINE VIEW myview
PATH customer->#(order->#(item->article) AS it) AS or
FIELD COUNT(or->order.id) AS ordercount
FIELD SUM(SUM(it->item.price) AS revenue
FIELD SUM(COUNT(it->article.id)) AS numofarticles
END VIEW
```

Thus, rather than including the navigation path and field selections in the request, the request may substitute "myview" for the navigation path and field selections.

In an embodiment, the view definition statement may be stored as a constant in the frontend application and/or service, and concatenated as prefix to each request sent by the frontend application and/or service. This makes the requests short and expressive, without compromising flexibility.

In an embodiment, for requests that don't have a significant impact on the system performance, the request translator may substitute the shorthand view with the corresponding statement. For example, the request translator may substitute the short-hand "myview" with the PATH expression and "ordercount," "revenue," etc. by the corresponding FIELD expressions.

Additionally or alternatively, the data service may record the time needed for processing the request and associates the information with the view, conditions, and/or field selections used in the request. The recorded information is also referred to herein as a "usage pattern."

In an embodiment, based on the usage pattern, the data service may determine whether to optimize the storage of data related to a particular view. The determination may be based on, for example, the frequency of use of the view, the amount of time used to process requests for the view, the cost of updating the data, the cost of updating a materialized (stored view), the number of read requests for the data, the number of write requests for the data, the frequency of modifications to the data, the cost of reading and/or writing unoptimized data, and the like.

As an example, based on the frequency of use for all requests using a specific view, the data service may determine that the specific view is a target for optimization. In response, the data service may automatically invoke the storage optimizer, which modifies the data store representation corresponding to the view, in order to achieve better performance metrics. The storage optimizer has access to the recorded information about all past requests that included a view, including the used field selections, filter conditions and their respective incidence counts and/or frequencies.

In an embodiment, an optimization includes adding indexes for foreign keys that are frequently used in JOIN clauses or for fields frequently used in WHERE conditions.

In an embodiment, for views involving many JOIN clauses, one or more materialized views can be created. The one or more materialized views may be stored in data store or in memory accessible by data service.

In an embodiment, the view definition for a materialized view is derived by translating PATH part of the soft-coded view definition. However, in the case of multi-level aggregations as in the example described above, the transition from a soft-coded view in the request language to a materialized view means that conditions defined the aggregated sub-selections cannot be changed in subsequent requests to this materialized view. Referring to the above example, the condition, "WHERE t4.category='sports'" is in the innermost aggregated sub-selection of the view. The materialized view may be used in lieu of the full query statements only when a filter on the article category "sports" is included in the request. In an embodiment, if conditions in aggregated sub-selections have a very small variation for the filter value, one materialized view per filter value can be created.

Additionally or alternatively, optimization may comprise identifying a sub-selection in a complex view that can be materialized without affecting any of the used filter criteria or aggregations.

In an embodiment, the storage optimizer calculates a cost estimate per time interval from the observed duration of unoptimized calls to the respective database parts and the observed frequency with which write or change requests to he respective tables and relevant fields are sent. Materialized views need to be updated when data changes, which consumes computing resources and thus can slow down write operations. A materialized view has to be re-calculated when data matching its filter criterion has been added or changed.

The performance impact from updating materialized views is taken into account during the optimization. In an embodiment, the storage optimizer may select an optimization strategy from a plurality of different optimization strategies based on the observed usage patterns and cost estimates.

In an embodiment, the choice of optimization strategies is based on relating the predicted average cost for write operations per time to the predicted time savings for read operations. The predicted time savings are calculated from the observed cost of unoptimized read operations, the number of rows and a heuristically determined factor relating the read time for materialized views to the number of rows.

In an embodiment, for frequently used requests, the data service may perform multiple optimizations in parallel or over a period of time (e.g., partial or full materialized views or indexes), and route a fraction of the requests to a particular optimization. The data service may measure which optimization yields the best performance improvements. This approach is analogous to performing AB tests in UI development in order to maximize the popularity of web pages.

Additionally or alternatively, machine learning algorithms can be applied to correlate the structure of requests to the most successful data store optimization strategy.

6.0 Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 10:
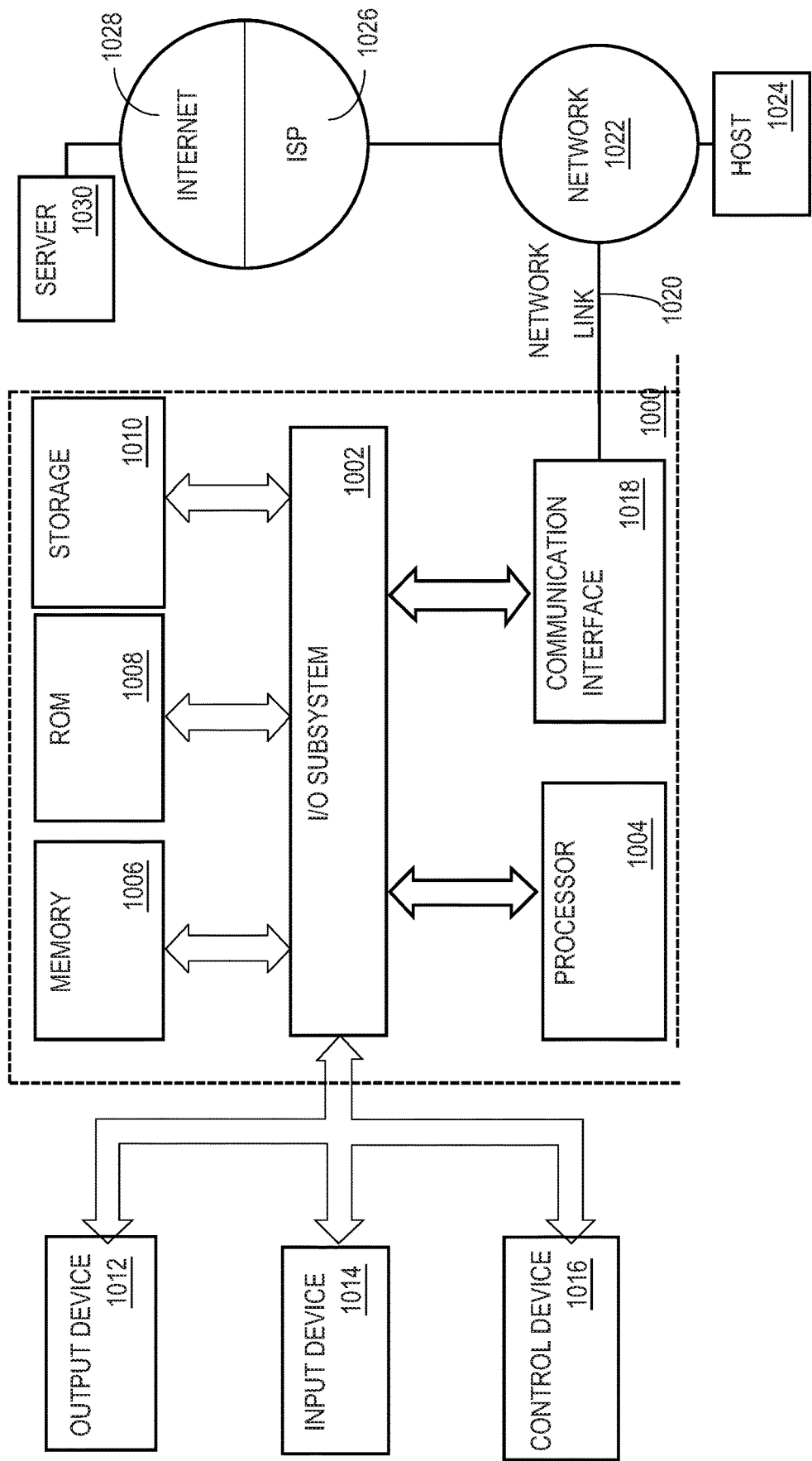
FIG. 10 is a block diagram that illustrates a computer system upon which an embodiment of the invention may be implemented.

FIG. 10 is a block diagram that illustrates an example computing device illustrated with a computer system 1000 with which an embodiment may be implemented. In the example of FIG. 10, the computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations. The computer system may be, for instance, a distributed computer with the processing handled by one or more processors.

Computer system 1000 includes an input/output (I/O) subsystem 1002 which may include a bus and/or other communication mechanism(s) for communicating information and/or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller and/or a special-purpose microprocessor such as an embedded system or a graphics processing unit (GPU) or a digital signal processor or ARM processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as FLASH memory, or solid-state storage, magnetic disk or optical disk such as CD-ROM or DVD-ROM and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1000 may be coupled via I/O subsystem 1002 to at least one output device 1012. In one embodiment, output device 1012 is a digital computer display. Examples of a display that may be used in various embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on display 1012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In another embodiment, computer system 1000 may comprise an interne of things (IoT) device in which one or more of the output device 1012, input device 1014, and control device 1016 are omitted. Or, in such an embodiment, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware and interfaces for generating position reporting packets, notifications, pulse or heartbeat signals, or other recurring data transmissions that specify a position of the computer system 1000, alone or in combination with other application-specific data, directed toward host 1024 or server 1030.

Computer system 1000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to a format that can be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to bus 1002. Communication interface 1018 provides a two-way data communication coupling to network link(s) 1020 that are directly or indirectly connected to at least one communication networks, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a local area network (LAN), wide-area network (WAN), campus network, internetwork or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic or optical signals over signal paths that carry digital data streams representing various types of information.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices and/or computers that are operated by an Internet Service Provider (ISP) 1026. ISP 1026 provides data communication services through a world-wide packet data communication network represented as internet 1028. A server computer 1030 may be coupled to internet 1028. Server 1030 broadly represents any computer, data center, virtual machine or virtual computing instance with or without a hypervisor, or computer executing a containerized program system such as DOCKER or KUBERNETES. Server 1030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1000 and server 1030 may form elements of a distributed computing system that includes other computers, a processing cluster, server farm or other organization of computers that cooperate to perform tasks or execute applications or services. Server 1030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1030 may comprise a web application server that hosts a presentation layer, application layer and data storage layer such as a relational database system using structured query language (SQL) or no SQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage 1010, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Items

The present method may be implemented in a single computing device like a server or a platform or distributed over a computer system as illustrated in FIG. 6. Such a computer system according to a first item comprises the following:

one or more processors;

one or more non-transitory computer-readable media storing instructions which, when executed by the one or more processors, cause:

generating and storing metadata that maps a domain model to data stored in a data store, wherein the domain model describes the data and relationships between the data;

receiving, from a client application, a request for data stored in the data store, wherein the request is in a first query language;

translating the request into one or more queries based on the metadata, wherein the one or more queries are in a second query language;

sending the one or more queries to the data store;

receiving a first result set from the data store, based on the data store executing the one or more queries.

A second item according to the first item, wherein the first result set is in a first data format, further comprises instructions which, when executed using the one or more processors, cause:

transforming the first result set to a second data format;

sending the first result set in the second data format to the client application.

A third item according to one of the previous items, wherein the data store is configured to store the data using a plurality of data formats, further comprises instructions which, when executed using the one or more processors, cause:

receiving a second result set in a third data format, wherein the third data format is different from the first data format and the second data format;

transforming the second result set to the second data format and combining the second result set with the first result set;

sending the combined result set to the client application.

A fourth item according to one of the previous items, wherein the data store is one of a plurality of different data stores, wherein each data store of the plurality of different data stores is configured to receive requests in a particular query language, further comprises instructions which, when executed using the one or more processors, cause selecting the second query language based on the data store for which the request was received.

A fifth item according to one of the previous item, comprises the first query language being a general request language, and the second query language being a data store specific query language.

A sixth item according to one of the previous items further comprises instructions which, when executed using the one or more processors, cause:

prior receiving a request for data, sending to the client application, metadata that describes the domain model.

A seventh item according to one of the previous items further comprises instructions which, when executed using the one or more processors, cause:

receiving a plurality of requests for data;

storing usage information associated with the plurality of requests;

based on the usage information, determining whether to optimize the data store;

in response to determining that the data store should be optimized, optimizing the data store based on the usage information.

An eighth item according to the seventh item comprises the determining based at least on one or more of: frequency of use of particular materialized views, processing time for received requests, cost of unoptimized read operations, frequency of data changes, and cost of updating materialized views.

A ninth item according to item 7 for which optimizing the data store comprises generating one or more materialized views based on the plurality of requests received.

A tenth item according to one of the previous items, for which translating the request into one or more queries comprises:

parsing the request to generate an abstract syntax tree based on the request;

determining a structure of the request and generating a structure model based on the request;

generating one or more annotations correlating one or more portions of the request with the metadata;

generating the one or more queries based on the abstract syntax tree, the structure model, and the one or more annotations.

What is claimed is:

1. A method comprising:
   generating and storing metadata that maps a domain model to data stored in a data store, wherein the domain model describes the data and relationships between the data;
   receiving, from a client application, a request for data stored in the data store, wherein the request is in a first query language;
   parsing the request to generate an abstract syntax tree based on the request;
   determining a structure of the request and generating a structure model based on the request;
   generating one or more annotations correlating one or more portions of the request with the metadata;
   generating one or more queries in a second query language based on the abstract syntax tree, the structure model, and the one or more annotations;
   sending the one or more queries to the data store;
   receiving a first result set from the data store, based on the data store executing the one or more queries.

2. The method of claim 1 wherein the first result set is in a first data format, the method further comprising:
   transforming the first result set to a second data format;
   sending the first result set in the second data format to the client application.

3. The method of claim 2 wherein the data store is configured to store the data using a plurality of data formats, the method further comprising:
   receiving a second result set in a third data format, wherein the third data format is different from the first data format and the second data format;
   transforming the second result set to the second data format and combining the second result set with the first result set;
   sending the combined result set to the client application.

4. The method of claim 1 wherein the data store is one of a plurality of different data stores, wherein each data store of the plurality of different data stores is configured to receive requests in a particular query language, the method further comprising selecting the second query language based on the data store for which the request was received.

5. The method of claim 1 wherein the first query language is a general request language, and wherein the second query language is a data store specific query language.

6. The method of claim 1 further comprising:
   prior to receiving a request for data, sending to the client application, metadata that describes the domain model.

7. The method of claim 1 further comprising:
   receiving a plurality of requests for data;
   storing usage information associated with the plurality of requests;
   based on the usage information, determining whether to optimize the data store;

in response to determining that the data store should be optimized, optimizing the data store based on the usage information.

8. The method of claim 7 wherein the determining is based at least on one or more of: frequency of use of particular materialized views, processing time for received requests, cost of unoptimized read operations, frequency of data changes, and cost of updating materialized views.

9. The method of claim 7 wherein optimizing the data store comprises generating one or more materialized views based on the plurality of requests received.

10. The method of claim 1, each of the one or more annotations containing a query language alias generated in a scope of the request.

11. A system comprising:
one or more processors;
one or more non-transitory computer-readable media storing instructions which, when executed by the one or more processors, cause:
generating and storing metadata that maps a domain model to data stored in a data store, wherein the domain model describes the data and relationships between the data;
receiving, from a client application, a request for data stored in the data store, wherein the request is in a first query language;
parsing the request to generate an abstract syntax tree based on the request;
determining a structure of the request and generating a structure model based on the request;
generating one or more annotations correlating one or more portions of the request with the metadata;
generating one or more queries in a second query language based on the abstract syntax tree, the structure model, and the one or more annotations;
sending the one or more queries to the data store;
receiving a first result set from the data store, based on the data store executing the one or more queries.

12. The system of claim 11 wherein the first result set is in a first data format, further comprising instructions which, when executed using the one or more processors, cause:
transforming the first result set to a second data format;
sending the first result set in the second data format to the client application.

13. The system of claim 12 wherein the data store is configured to store the data using a plurality of data formats, further comprising instructions which, when executed using the one or more processors, cause:

receiving a second result set in a third data format, wherein the third data format is different from the first data format and the second data format;
transforming the second result set to the second data format and combining the second result set with the first result set;
sending the combined result set to the client application.

14. The system of claim 11 wherein the data store is one of a plurality of different data stores, wherein each data store of the plurality of different data stores is configured to receive requests in a particular query language, further comprising instructions which, when executed using the one or more processors, cause selecting the second query language based on the data store for which the request was received.

15. The system of claim 11 wherein the first query language is a general request language, and wherein the second query language is a data store specific query language.

16. The system of claim 11 further comprising instructions which, when executed using the one or more processors, cause:
prior to receiving a request for data, sending to the client application, metadata that describes the domain model.

17. The system of claim 11 further comprising instructions which, when executed using the one or more processors, cause:
receiving a plurality of requests for data;
storing usage information associated with the plurality of requests;
based on the usage information, determining whether to optimize the data store;
in response to determining that the data store should be optimized, optimizing the data store based on the usage information.

18. The system of claim 17 wherein the determining is based at least on one or more of: frequency of use of particular materialized views, processing time for received requests, cost of unoptimized read operations, frequency of data changes, and cost of updating materialized views.

19. The system of claim 17 wherein optimizing the data store comprises generating one or more materialized views based on the plurality of requests received.

20. The system of claim 11, each of the one or more annotations containing a query language alias generated in a scope of the request.

* * * * *